(12) United States Patent
Liu et al.

(10) Patent No.: US 11,689,097 B2
(45) Date of Patent: Jun. 27, 2023

(54) HIGH-VOLTAGE TO LOW-VOLTAGE INTERFACE IN POWER CONVERTER CIRCUIT

(71) Applicant: Analog Devices, Inc., Wilmington, MA (US)

(72) Inventors: Wen Chuen Liu, Santa Clara, CA (US); Xugang Ke, Milpitas, CA (US); Min Chen, Fremont, CA (US); Wei Gu, San Jose, CA (US)

(73) Assignee: Analog Devices, Inc., Wilmington, MA (US)

( * ) Notice: Subject to any disclaimer, the term of this patent is extended or adjusted under 35 U.S.C. 154(b) by 143 days.

(21) Appl. No.: 17/308,517

(22) Filed: May 5, 2021

(65) Prior Publication Data

US 2022/0360165 A1 Nov. 10, 2022

(51) Int. Cl.
*H02M 3/335* (2006.01)
*H02M 1/36* (2007.01)

(52) U.S. Cl.
CPC ......... *H02M 1/36* (2013.01); *H02M 3/33507* (2013.01)

(58) Field of Classification Search
None
See application file for complete search history.

(56) References Cited

U.S. PATENT DOCUMENTS

| 8,045,348 | B2 | 10/2011 | Zhu et al. |
| 9,077,248 | B2 | 7/2015 | Brinlee |
| 9,590,513 | B2 | 3/2017 | Fahlenkamp |
| 9,698,599 | B2 | 7/2017 | Stratakos et al. |
| 9,912,228 | B2 | 3/2018 | Al-Shyoukh et al. |
| 10,083,953 | B2 | 9/2018 | Saito |
| 10,090,770 | B2 | 10/2018 | Langeslag et al. |
| 10,401,887 | B2 * | 9/2019 | Huang ...................... G05F 3/30 |
| 10,574,224 | B2 * | 2/2020 | Fu ......................... H03K 17/163 |
| 10,608,525 | B2 | 3/2020 | Balakrishnan et al. |
| 10,691,189 | B2 | 6/2020 | Su et al. |
| 2012/0287685 | A1 * | 11/2012 | Fahlenkamp ........... H02M 1/36 363/49 |

(Continued)

FOREIGN PATENT DOCUMENTS

| EP | 1155459 A1 | 11/2001 |
| WO | WO-2015073980 A1 | 5/2015 |
| WO | WO-2022236275 A1 | 11/2022 |

OTHER PUBLICATIONS

"International Application Serial No. PCT/US2022/072098, International Search Report dated Aug. 31, 2022", 3 pgs.

(Continued)

*Primary Examiner* — Jeffrey A Gblende
(74) *Attorney, Agent, or Firm* — Schwegman Lundberg & Woessner, P.A.

(57) ABSTRACT

A UHV-LV interface circuit that is capable of the following, among other things: 1) starting up a primary controller of a power converter circuit with a precisely controlled startup charging profile; 2) performing pulse-based line-voltage sensing with reduced power and improved sensing accuracy; and 3) discharging a capacitor, e.g., class-X2 capacitor, with a stable supply voltage for the controller. The UHV-LV interface circuit can use a single UHV device, such as a single depletion-mode transistor, e.g., field-effect transistor (FET).

15 Claims, 4 Drawing Sheets

(56) References Cited

U.S. PATENT DOCUMENTS

| | | | |
|---|---|---|---|
| 2015/0162830 A1* | 6/2015 | Dong | H02M 1/36 323/271 |
| 2015/0365084 A1 | 12/2015 | Hirler et al. | |
| 2018/0226885 A1 | 8/2018 | Hwang | |
| 2019/0020266 A1 | 1/2019 | Chu | |
| 2019/0123636 A1 | 4/2019 | Moallem et al. | |
| 2020/0274530 A1 | 8/2020 | Lueders et al. | |

OTHER PUBLICATIONS

"International Application Serial No. PCT/US2022/072098, Written Opinion dated Aug. 31, 2022", 3 pgs.

"AOZ7523XAI: Current Mode Flyback Converter with HV Start-Up and Advanced Features", Alpha & Omega Semiconductor Data Sheet, (May 2018), 19 pgs.

"AP3108L: High-Performance Green Mode PWM Controller", Diodes Incorporated Data Sheet, (Dec. 2018), 16 pgs.

"High-Voltage, Quasi-Resonant, Controller Featuring Valley Lock-Out Switching—NCP1340", On Semiconductor Data Sheet, (2019), 43 pgs.

"IDP2303A: Digital Multi-Mode PFC + LLC Combo Controller", Infineon Data Sheet, (2017), 39 pgs.

"STCMB1: TM PFC with X-cap discharge and LLC resonant combo controller", STMicroelectronics Data Sheet, (2018), 59 pgs.

"UCC256304 Ultra Wde V(IN) LLC Resonant Controller Enabling Low Standby Power", Texas Instruments Data Sheet, (Oct. 2017), 72 pgs.

"UCC29950 COM PFC and LLC Combo Controller", Texas Instruments Data Sheet, (Mar. 2015), 68 pgs.

Kwan, Hing Kit, et al., "AC/DC flyback controller with UHV integrated startup current source in 180nm HVIC Technology", Proceedings of the 30th International Symposium on Power Semiconductor Devices & ICs, IEEE, Chicago, USA, (2018), 359-362.

* cited by examiner

HIGH-VOLTAGE TO LOW-VOLTAGE INTERFACE IN POWER CONVERTER CIRCUIT

FIELD OF THE DISCLOSURE

This document relates generally to power converter circuits and more particularly, but not limited to, a power converter interface circuit between two voltage domains.

BACKGROUND

Power converters that use ultra-high-voltage (UHV) devices are becoming widely adopted for high voltage applications, like fast charging. However, UHV devices can be large and can be mainly targeted at power switches, which may not be fully optimized for control circuit. As such, there can be a large voltage difference between the UHV power devices and the common low-voltage (LV) controller circuit of the power converter. A UHV-LV interface can be used to communicate between two voltage domains: the UHV voltage domain can be 700V or higher, and the LV domain can be less than about 30V. Most of the LV circuit can be about 5V, with more voltage headroom provided to guarantee normal operation.

SUMMARY OF THE DISCLOSURE

This disclosure describes a UHV-LV interface circuit that is capable of the following, among other things: 1) starting up a primary controller of a power converter circuit, such as the primary controller 102 of FIG. 1, with a precisely controlled startup charging profile; 2) performing pulse-based line-voltage sensing with reduced power and improved sensing accuracy; and 3) discharging a capacitor, e.g., class-X2 capacitor, with a stable supply voltage for the controller. The UHV-LV interface circuit of this disclosure can use a single UHV device, such as a single depletion-mode transistor, e.g., field-effect transistor (FET).

In some aspects, this disclosure is directed to an interface circuit to couple an input voltage in a first voltage domain to a controller of a power converter circuit in a second voltage domain, the interface circuit comprising: a start-up circuit including: a current limiter circuit having an input to couple with a terminal of a high-voltage transistor, the current limiter circuit having an output to couple with and provide an input voltage to an input of the controller of the power converter circuit; and a first shunt regulator circuit having an input to couple with the terminal of the high-voltage transistor, the first shunt regulator circuit to maintain a first voltage at the terminal of the high-voltage transistor.

In some aspects, this disclosure is directed to a method of operating an interface circuit coupled between a first voltage domain and a second voltage domain, the method comprising: during start-up of a controller of a power converter circuit in the second voltage domain: limiting a current through a high-voltage transistor that connects the first voltage domain and the second voltage domain; controlling a voltage at a source terminal of the high-voltage transistor to be a first source voltage; and during a time following the start-up of the controller of the power converter circuit in the second voltage domain: in response to detecting a brownout voltage condition: controlling the voltage at the source terminal of the high-voltage transistor to be a second source voltage, the second source voltage less than the first source voltage.

In some aspects, this disclosure is directed to an interface circuit to couple an input voltage in a first voltage domain to a controller of a power converter circuit in a second voltage domain, the interface circuit comprising: a depletion-mode transistor having a gate terminal, a source terminal, a drain terminal, and a substrate terminal, wherein the substrate terminal is connected to a ground potential; a start-up circuit including: a current limiter circuit having an input to couple with a terminal of a high-voltage transistor, the current limiter circuit having an output to couple with and provide an input voltage to an input of the controller of the power converter circuit; and a first shunt regulator circuit having an input to couple with the terminal of the high-voltage transistor, the first shunt regulator circuit to maintain a first voltage at the terminal of the high-voltage transistor; and a line voltage detection circuit to sense a current proportional to a line voltage, the line voltage detection circuit including: a second shunt regulator circuit having an input to couple with the terminal of the high-voltage transistor, the second shunt regulator circuit to maintain a second voltage at the terminal of the high-voltage transistor, the second voltage lower than the first voltage.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
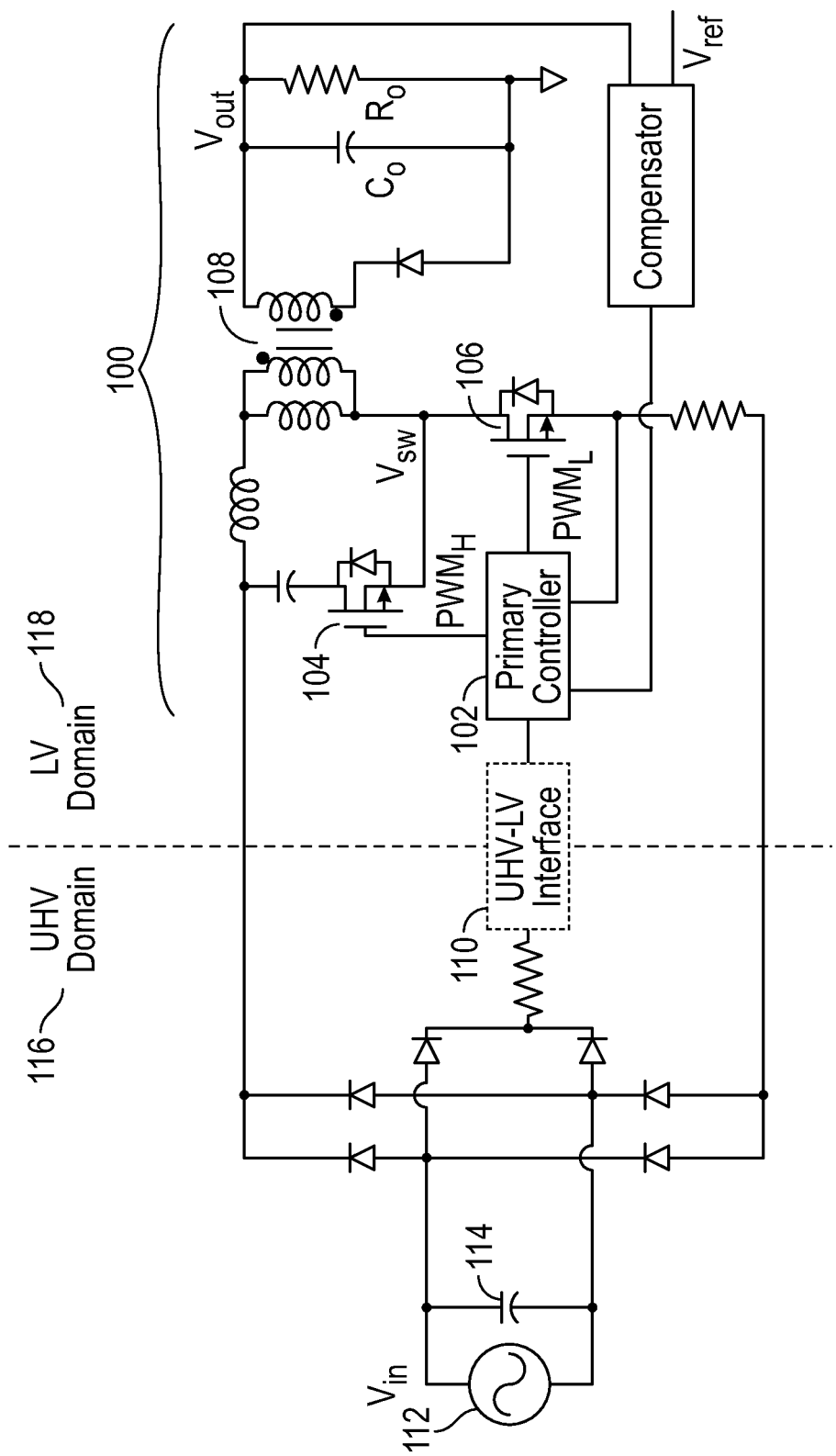
FIG. 1 is an example of a power converter circuit coupled with a UHV-LV interface circuit.

FIG. 1 is an example of a power converter circuit coupled with a UHV-LV interface circuit. The power converter circuit 100, e.g., a flyback converter circuit, can include, among other things, a primary controller 102 to provide pulse-width-modulation (PWM) control signals to transistors 104, 106 to provide, via transformer 108, an output voltage VOUT. The transistors 104, 106 can be UHV switches.

The primary controller 102 can be coupled to a UHV voltage domain using a UHV-LV interface circuit 110. In some examples, the UHV voltage domain can be 700V or higher. The UHV voltage domain can include an AC voltage source 112 that can provide an input voltage VIN and a capacitor 114, such as a class-X2 capacitor, coupled between the line and neutral voltages of the AC voltage source 112. In this manner, the UHV-LV interface circuit 110 can couple an input voltage VIN in a first voltage domain, e.g., UHV domain 116, to a controller of a power converter circuit in a second voltage domain, e.g., LV domain 118.

The UHV-LV interface circuit 110 can perform several important functions with the UHV domain, such as start-up (such as when UHV/AC line voltage is the only available voltage source), line voltage sensing, and capacitor discharging (e.g., class-X2 capacitor discharging). In some approaches, start-up of the supply voltage (VCC) can be achieved using a depletion-mode field-effect transistor (FET) with a negative threshold voltage along with a shunt regulator and a current-limiting resistor (e.g., about 1 kilohm). However, the profile of the IVCC current flowing from the UHV voltage domain to the supply voltage rail VCC can be curved and unpredictable. For example, the current can vary with the FET source voltage, the FET saturation current, and the voltage difference between UHV and VCC. The curved IVCC current profile can complicate the design for the VCC bypass capacitance, the start-up timer, as well as the device current rating.

This disclosure describes a UHV-LV interface circuit that is capable of the following, among other things: 1) start up a primary controller of a power converter circuit, such as the primary controller 102 of FIG. 1, with a precisely controlled startup charging profile; 2) perform pulse-based line-voltage sensing with reduced power and improved sensing accuracy; and 3) discharge a capacitor, e.g., class-X2 capacitor, with a stable supply voltage for the controller. The UHV-LV interface circuit of this disclosure can use a single UHV device, such as a single depletion-mode transistor, e.g., field-effect transistor (FET).

Figure 2:
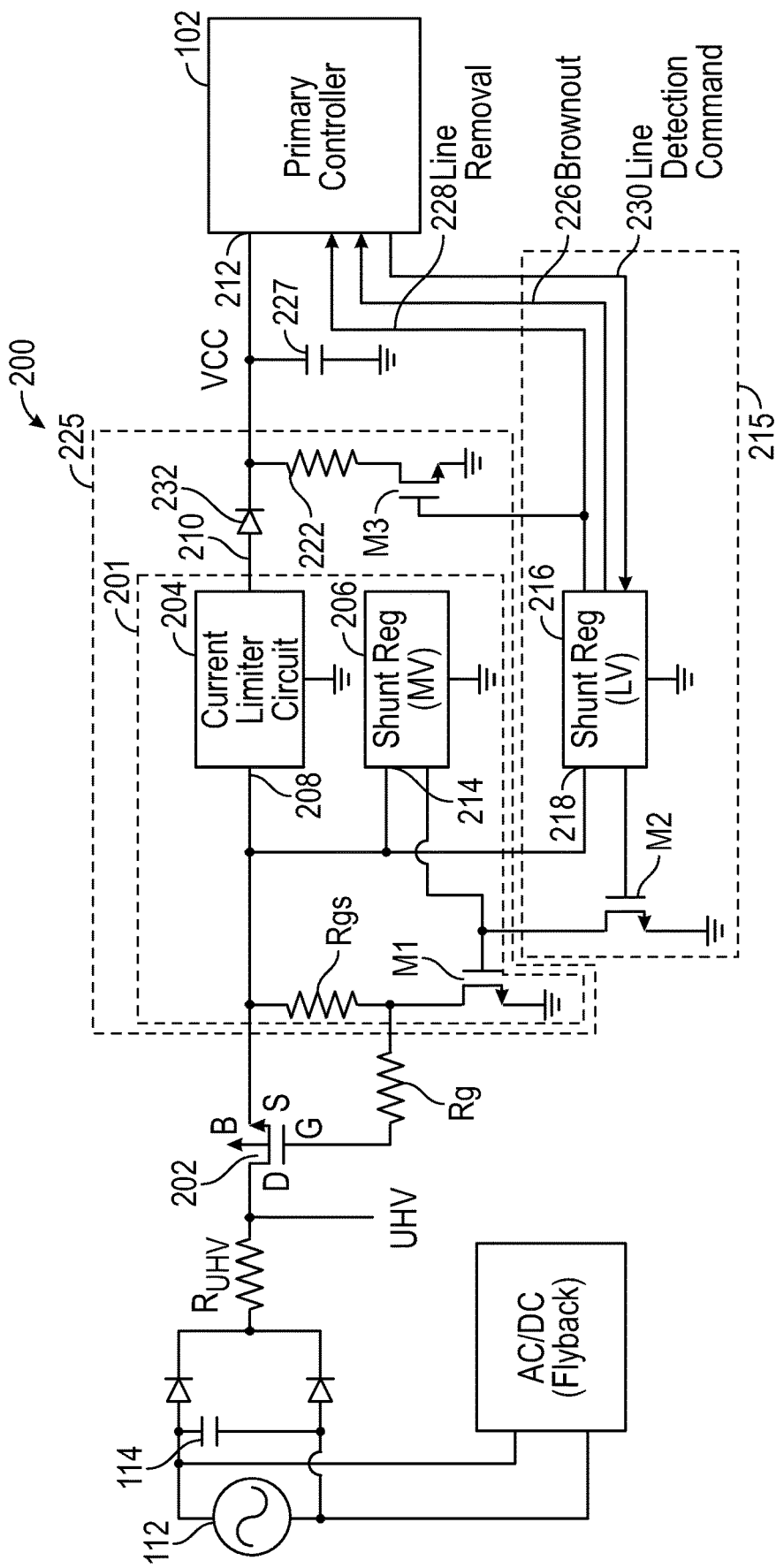
FIG. 2 is an example of a UHV-LV interface circuit in accordance with this disclosure.

FIG. 2 is an example of a UHV-LV interface circuit in accordance with this disclosure. The UHV-LV interface circuit 200 is an example of the UHV-LV interface circuit 110 of FIG. 1. Some of the components in FIG. 2 are similar to components in FIG. 1 and labeled with similar reference numbers and, for purposes of conciseness, will not be described again. The UHV-LV interface circuit 200 can couple an input voltage VIN in a first voltage domain, e.g., a UHV domain, to a controller 102 of a power converter circuit in a second voltage domain, e.g., an LV domain. Voltages of ultra-high-voltage nodes can be large enough to exceed a voltage capability of a low-voltage transistor structure in the circuit but not large enough to exceed a voltage capability of an ultra-high-voltage transistor structure in the circuit, and voltages of low-voltage nodes can be low enough to accommodate a voltage capability of a low-voltage transistor structure in a circuit. Ultra-high voltage nodes can be at about 700 V or higher and low-voltage nodes can be less than about 10 V. Most of the circuit can be about 5V, with more headroom provided to guarantee normal operation.

The UHV-LV interface circuit 200 can include a high-voltage transistor 202. In some examples, the high-voltage transistor 202 can be a depletion-mode field-effect transistor (FET) having a gate terminal (G), a source terminal (S), a drain terminal (D), and a substrate terminal (B), where the bulk or substrate terminal (B) is connected to a ground voltage potential. The UHV-LV interface circuit 200 can be operated by having the drain terminal of the high-voltage transistor 202 connected to the ultra-high-voltage domain, and the gate and source voltage, both in the low-voltage domain, can be reconfigured through several low-voltage circuit blocks for different purposes.

Depletion-mode FETs with a negative threshold voltage can be used as a UHV-LV interface device. In accordance with this disclosure, the substrate (B) terminal of the high-voltage transistor 202, such as a depletion-mode FET, can be connected to a ground voltage potential instead of its source terminal. Connecting the substrate (B) terminal to the ground potential voltage instead of the source terminal can result in different I-V characteristics, such as a much lower current through the transistor at higher source voltages. In addition, connecting the substrate (B) terminal to the ground potential voltage instead of the source terminal can provide an auto-overvoltage protection using the intrinsic body effect.

The transistor 202 can be coupled with a resistor $R_{UHV}$. The resistor $R_{UHV}$ can serve as a current limiter and can reduce any current spikes that can occur during initial conditions. In some examples, the resistor $R_{UHV}$ can serve as a sense resistor for low-voltage (brownout) sensing.

The UHV-LV interface circuit 200 can include a start-up circuit 201 that can include a current limiter circuit 204 and a first shunt regulator circuit 206. In some examples, the current limiter circuit 204 can be coupled in parallel with the first shunt regulator circuit 206, such as shown in FIG. 2.

The current limiter circuit has an input 208 to couple with a terminal, e.g., source terminal, of the high-voltage transistor 202, and an output 210 to couple with and provide an input voltage VCC to an input 212 of the controller 102 of the power converter circuit. In some examples, the current limiter circuit 204 can include a current mirror circuit.

The first shunt regulator circuit 206 can include an input 214 to couple with the terminal, e.g., the source terminal, of the high-voltage transistor 202. The first shunt regulator circuit 206 can maintain a first voltage at a terminal, e.g., source terminal, of the high-voltage transistor 202.

To kick start the supply voltage rail VCC for the controller 102, the UHV-LV interface circuit 200 can use the first shunt regulator circuit 206 (e.g., a weak shunt regulator), the high-voltage transistor 202 (e.g., a hard-pull-down FET), and the current limiter circuit 204 to the transistor ON and OFF, such as by controlling the gate-source voltage (Vgs) of the transistor 202 from a negative value to zero in order to regulate the current injected into the supply rail until a certain voltage is reached, e.g., less than 10 V.

The start-up circuit 201 can regulate the source voltage (Vs) of the transistor 202 through the first shunt regulator circuit 206 along with a hard-gate-pull-down transistor M1. The start-up circuit 201 can first turn ON the depletion-mode FET 202 by tying the gate voltage (Vg) and source voltage (Vs) together to allow the maximum current flowing through the transistor 202.

In some examples, a gate resistor Rg can be added for gate protection of the transistor 202. On the other side, the transistor 202 can be turned OFF by grounding the gate voltage Vg using the transistor M1, thereby reducing the static current supplied from UHV. In some examples, a gate-to-source resistor Rgs having a high resistance can be chosen to reduce power consumption and decoupling the voltages between the source terminal and the gate terminal of the transistor when the gate terminal is grounded. In some examples, with the first shunt regulator circuit 206 setting up a suitable source voltage of the transistor 202, such as much lower than UHV and higher than the supply voltage rail VCC, the current limiter circuit 204 can include a current mirror, instead of a current limiting resistor, to provide a controlled, smoother, and more precise current flowing to the supply voltage rail VCC.

In some examples, the UHV-LV interface circuit 200 can include a line voltage detection circuit 215 to sense a current proportional to a line voltage (or "line sensing"). The line voltage detection circuit 215 can be in parallel with the start-up circuit, for example.

The line voltage detection circuit 215 can include a second shunt regulator circuit 216, e.g., a strong shunt regulator, that has an input 218 to couple with a terminal, e.g., the source terminal, of the high-voltage transistor 202. In some examples, the second shunt regulator circuit 216 can be implemented by a single-stage amplifier, an NMOS switch and an NMOS current mirror and shunting at a different voltage than the first shunt regulator circuit 206 to maximize the detection dynamic range.

The second shunt regulator circuit 216 can maintain a second voltage at the terminal, e.g., the source terminal, of the high-voltage transistor 202, where the second voltage, e.g., 2V, is lower than the first voltage, e.g., 12V, that can be maintained at the terminal by the first shunt regulator circuit 206. The second voltage is lower than the first voltage in order to override the first shunt regulator circuit 206 and to maximize dynamic range. The line voltage detection circuit 215 can regulate the source voltage (Vs) of the transistor 202 through the second shunt regulator circuit 216 along with a hard-gate-pull-down low-voltage transistor M2 to disable the low-voltage transistor M1.

The second shunt regulator circuit 216 can achieve more accurate sensing by not only regulating the source voltage (Vs) of the transistor 202 at a lower voltage, such as to increase the saturation current of the transistor 202, but also drawing sufficient current from the UHV domain, such as to counteract the diode leakage current.

The current drawn by the second shunt regulator circuit 216 can be mirrored for further detection and calculation, such as when UHV is below a particular voltage for some time, and a line removal condition, such as when UHV does not have a sufficiently decreasing slope or line zero crossing.

The second shunt regulator circuit 216 can pull the gate voltage (Vg) of the transistor 202 down to curb the static current from UHV, which can significantly reduce the power consumption. For example, the second shunt regulator circuit 216 can release the transistor M2, thereby the transistor M2 is initially ON and during its OFF state the transistor M1 is controlled by the first shunt regulator 206. When line sensing is performed, the transistor M2 is ON, which drags the gate voltage Vg of the transistor M1 down and forces the transistor M1 to be off so that the transistor 202 can be turned ON with its gate voltage Vg equal to its source voltage Vs.

Additional design freedoms, such as the sensing window and sensing rate, are available for optimizing the sensing response time as well as the power consumption.

High-voltage line sensing can be implemented using the second shunt regulator circuit 216, such as a strong shunt regulator or a current sinker, with a lower regulated voltage (~2V) at the source terminal of the transistor 202, and the high-voltage information can then be squeezed into a mirrored current for further calculation and detection, including but not limited to brownout, overvoltage and AC line removal events. A lower shunt voltage can help ensure more accurate sensing with a higher dynamic range.

The second shunt regulator circuit 216 can sense a current that is proportional to the line voltage. The second shunt regulator circuit 216 can output a low voltage detection signal 226 to the controller 102 in response to detecting an AC low voltage (brownout) condition. In addition, the second shunt regulator circuit 216 can generate a line removal signal 228 to the controller 102 in response to detecting a line removal condition. The line removal signal 228 can control a control node of a low-voltage transistor M3, such as the gate of a FET, of a capacitor discharging circuit 225. The line removal signal 228 can also be output to the controller 102 of the power converter circuit. The controller 102 can communicate a signal 230, e.g., a periodic signal, to the second shunt regulator circuit 216. In some examples, the signal 230 can be a command signal for line detection. If the signal 230 is high, then the transistor M2 can be turned ON and the second shunt regulator circuit 216 can start regulating the source voltage Vs of the transistor 202, squeezing the current.

In some examples, the UHV-LV interface circuit 200 can include a capacitor discharging circuit 225 that can control the supply voltage rail VCC while discharging the capacitor 114. The capacitor discharging circuit 225 can include a low-voltage transistor M3 coupled to a current source 222, such as a resistor. As seen in FIG. 2, the current source 222 and the transistor M3 can be coupled to the cathode of a diode 232. Further, the capacitor discharging circuit can be coupled with the input 212 of the controller 102 of the power converter circuit, such as the power converter circuit 100 of FIG. 1. An output of the second shunt regulator circuit 216 can be coupled with a control node of the low-voltage transistor M3, such as the gate of a FET.

The capacitor discharging circuit 225 can operate in response to removal of the UHV line voltage. For example, when the AC line voltage is removed or when an adapter is unplugged from an electrical outlet, the capacitor discharging circuit 225 can discharge the capacitor 114, such a class-X2 capacitor, coupled between the line and neutral of the AC voltage source 112.

Using various techniques of this disclosure, the capacitor discharging circuit 225 can reuse many components of the start-up circuit 201 as well as the low-voltage pull-down transistor M3 and the depletion-mode FET 202 to serve as a discharging path for the capacitor 114. For example, the capacitor discharging circuit 225 can include the current limiter circuit 204 of the start-up circuit 201. The capacitor discharging circuit 225 can combine the start-up circuit 201 with a pull-down transistor M3 to have a higher VCC range and lower limiting current than the start-up circuit. In addition, combining the start-up circuit 201 with the pull-down transistor M3 can help regulate the supply voltage rail VCC to be within a healthy operating range, e.g., greater than about 10V, during the line removal. As a result, the capacitor 114 at the UHV domain can be discharged in a smooth and predictable fashion while the controller 102 is still awake monitoring and controlling the power converter circuit.

In some examples, the start-up circuit, the line sensing circuit, and the capacitor discharging circuit can operate in a time-multiplexed fashion, where each function is implemented over a common path, such as through the transistor 202, by use of command switches so that each function occupies the line for only a fraction of time. For example, only the start-up operation will be working when the supply voltage is below some threshold, and all other circuits remained deactivated until activated by the controller 102.

Figure 3:
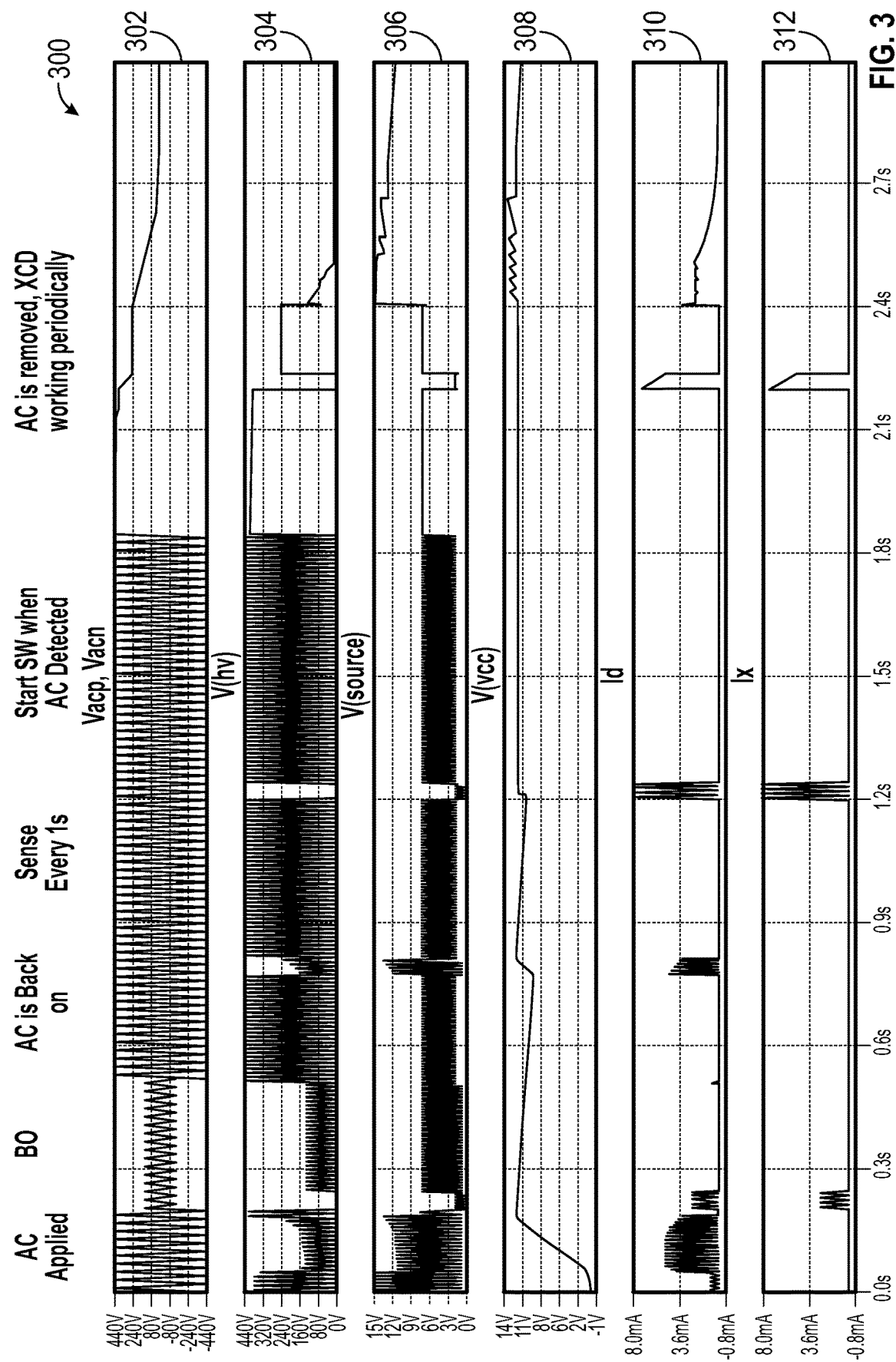
FIG. 3 is an example of various waveform simulations for the UHV-LV interface described in this disclosure.

FIG. 3 is an example of various waveform simulations for the UHV-LV interface described in this disclosure. The waveform simulations 300 depict the AC line voltage 302 applied to an AC/DC power converter circuit, such as the power converter circuit 100 of FIG. 1, such as an AC bridge cascaded with flyback converters. The UHV voltage V(uhv) shown at graph 304 is the drain voltage (or higher voltage) at the transistor 202 of FIG. 2. The voltage V(source), which can be a lower voltage or clamped voltage, shown at graph 306 is the source voltage of the transistor 202 of FIG. 2. The voltage V(vcc) shown at graph 308 is the supply voltage to the controller 102 of FIG. 2. The current Id shown at graph 310 is the current through the transistor 202 of FIG. 2. The current Ix shown at graph 312 is the current through the diode 232 of FIG. 2.

As shown across the top of the waveform simulations 300, various scenarios are depicted including, AC applied, brownout (BO), AC is back ON, sensing every 1 second, start switching when AC is detected, and AC is removed with the capacitor discharge circuit working periodically. Initially, the AC line voltage can be applied with sufficient voltage, and a supply voltage rail VCC capacitor 227 of FIG. 2 can be charged through the transistor 202 of FIG. 2.

When the supply voltage rail VCC is below 0.7V, the charging current can be limited to a lower value, such as 0.6 mA, to assist with a low power consumption until the system is more stable. When the supply voltage rail VCC is more than 0.7V, the charging current can be increased to around 5 mA for a faster start-up.

After the supply voltage rail VCC rises to 12V, the multiplexed interface circuit can pause charging the supply voltage rail VCC and start sensing the line voltage by dragging the source voltage (Vs) of the transistor 202 of FIG. 2 to around 2V with more than 2 mA current drawn from UHV. The 2 mA current is high enough to counteract the diode bridge leakage current in most situations.

The UHV information can be represented by Isense= (Vac−2)/$R_{UHV}$, where the resistor $R_{UHV}$ of FIG. 2 can help to define the brownout voltage given a threshold sensing current. In the scenario shown in FIG. 3, the AC line voltage 302 drops and enters the brownout condition during the first sensing window, leaving the power converter unprepared to start switching.

Before the power converter circuit starts switching, the start-up circuit 201 of FIG. 2 can maintain the supply voltage rail VCC between 9V to 12V, where the intentional 3V hysteresis band can reduce the power supply rail VCC capacitance requirement and charging frequency. With the line sensing occurring every one second, the power converter circuit can start switching once the sensing current is higher than a current threshold (IBO), such as converted from a brownout voltage (VB0). Once the AC line voltage is out of the brownout condition, the start-up circuit 201 can stop charging, and a stronger and more stable voltage can replace it, e.g., the voltage at the auxiliary winding in the flyback converter. Lastly, when the line voltage detection circuit 215 senses an AC line removal event, the line removal command requests the discharging device to draw current from the supply voltage rail VCC capacitor 227 of FIG. 2, and the capacitor 114, until the voltage across the capacitor 114 drops to a certain level.

Figure 4:
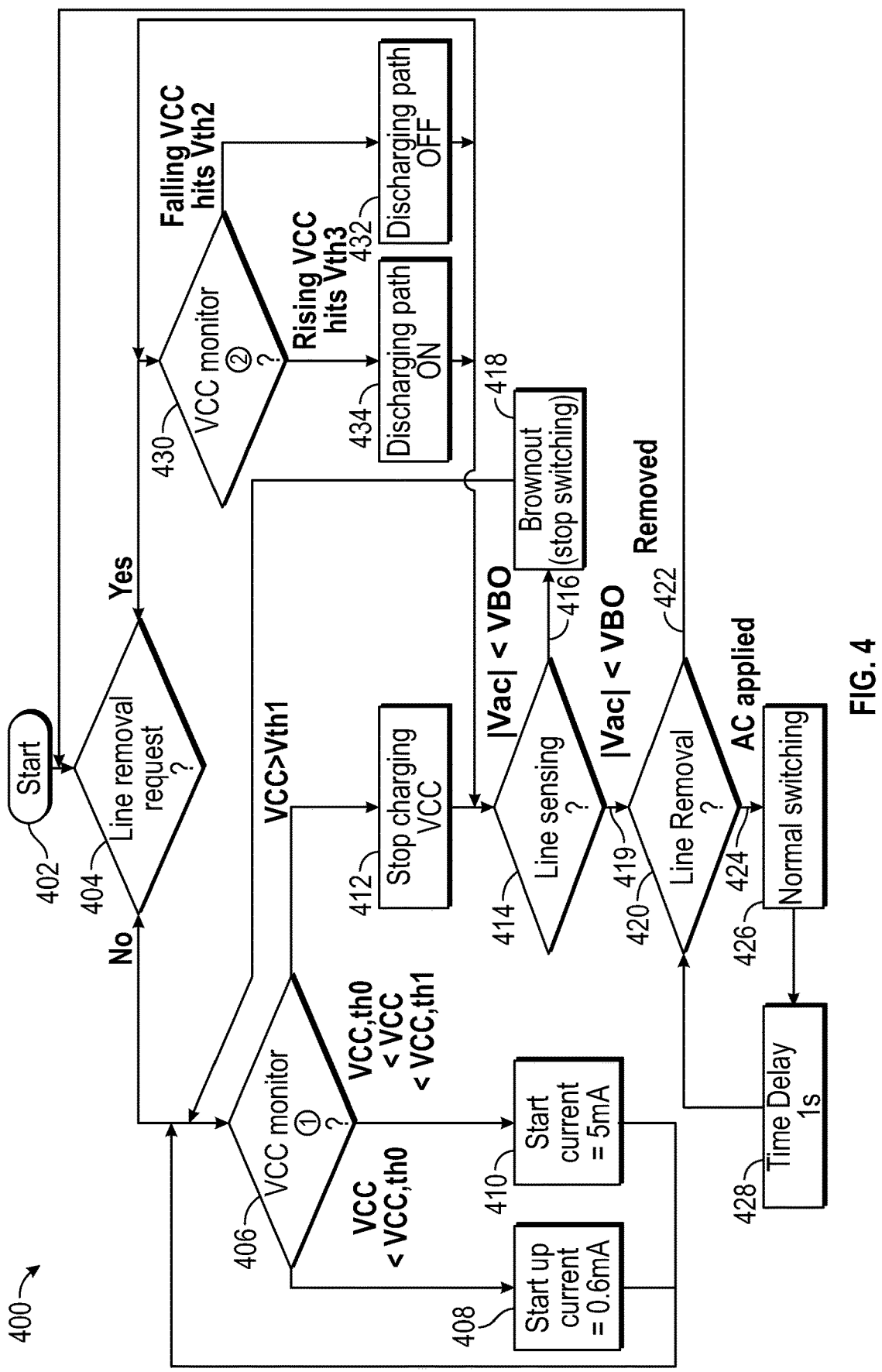
FIG. 4 is an example of a flow diagram 400 of the operation of the interface circuit shown in FIG. 2.

FIG. 4 is an example of a flow diagram of a method 400 of the operation of the interface circuit shown in FIG. 2. The method 400 starts at block 402. Initially, there is no line removal request ("NO" branch of block 404), and there is no supply voltage VCC, so supply voltage VCC monitoring is performed at block 406, such as by the primary controller 102 of FIG. 2. The first shunt regulator circuit 206 along with the hard pull-down helps maintain the source voltage of the transistor 202 at around 15V.

At block 408, if the supply voltage rail VCC is less than a first threshold voltage $VCC_{TH0}$, such as 0.7V, the start-up current can be limited to 0.6 mA by the current limiter circuit 204 of FIG. 2. The current limiter circuit 204 of FIG. 2, such as including a current mirror circuit, can provide a controlled current profile, such as shown at 308 in FIG. 3.

The primary controller 102 of FIG. 2, for example, can continue monitoring the supply voltage rail VCC. At block 410, if the supply voltage rail VCC is greater than the first threshold voltage $VCC_{TH0}$, such as 0.7V, and less than a second threshold voltage $VCC_{TH1}$, such as 12V, there is sufficient energy to charge the supply voltage rail VCC and, as such, more current can be pulled from the UHV node of FIG. 2. The start-up current can be increased to 5 mA by the current limiter circuit 204 of FIG. 2.

At block 412, if the supply voltage rail VCC is greater than the second threshold voltage $VCC_{TH1}$, such as greater than 12V, then the interface circuit can stop charging the supply voltage rail VCC.

At block 414, after stopping the charging of supply voltage rail VCC, the interface circuit can perform line sensing, such as by using the line voltage detection circuit 215 of FIG. 2. The line voltage detection circuit 215 of FIG. 2 can attempt to clamp the source voltage of the transistor 202 of FIG. 2.

The line sensing circuit of FIG. 2 can monitor two conditions: low-voltage (brownout) and line removal. For the low-voltage condition, if the absolute value of the AC line voltage is less than a brownout voltage threshold VBO (branch 416 of block 414), then the line voltage detection circuit 215 can determine that a brownout condition exists and can generate a low voltage detection signal 226 to the controller 102 of FIG. 2 at block 418. In response to receiving the low voltage detection signal 226, the controller 102 can stop the converter circuit from switching.

For the line-removal condition, if the absolute value of the AC line voltage is greater than a brownout voltage threshold VBO (branch 419 of block 414), then the line voltage detection circuit 215 can determine that a line-removal condition exists at block 420 and can generate a line removal signal 228 to the controller 102 of FIG. 2 (branch 422 of block 420).

If a line-removal condition exists, then the line voltage detection circuit 215 of FIG. 2 can determine whether there was a line removal request at block 404. In some examples, the line voltage detection circuit 215 of FIG. 2 can check and, in some examples, re-check whether there was a line removal request to be certain.

If there was a line removal request ("YES" branch of block 404) from the primary controller 102, then the interface circuit can attempt to discharge the capacitor 114 if FIG. 2 using the capacitor discharging circuit 225 of FIG. 2. At block 430, the first shunt regulator circuit 206 of FIG. 2 can monitor the voltage Vs of the source terminal of the transistor 202. The current limiter circuit 204 of FIG. 2 can be reused for capacitor discharging and can draw a constant current, such as 2 mA, to discharge the supply voltage rail VCC and through the low-voltage transistor M3 to ground.

If the supply voltage VCC is falling and reaches a threshold $V_{TH2}$, such as 12V, then the capacitor discharging circuit 225 of FIG. 2 can turn the discharge path OFF at block 432. If the supply voltage rail VCC is rising and reaches a threshold $V_{TH3}$, such as 13V, then the capacitor discharging circuit 225 of FIG. 2 can turn the discharge path ON at block 434.

The capacitor discharging circuit 225 of FIG. 2 can discharge for a period of time and then the method 400 can return to block 414 for the line voltage detection circuit 215 to check the status of the line voltage.

Referring back to block 420, if the line voltage detection circuit 215 of FIG. 2 determines that the AC line voltage has returned (branch 424 of block 420), then the line voltage detection circuit 215 can terminate the line removal signal 228 to the controller 102 of FIG. 2 and, in response, the controller 102 can begin normal switching of the power converter circuit at block 426. The line voltage detection circuit 215 of FIG. 2 can monitor the line voltage, such as at regular intervals, such as every one second, as shown at block 428.

Using various techniques of this disclosure, the start-up circuit can provide a controlled current profile, such as by using a current mirror circuit. The start-up circuit can provide a constant current that is easy predict. In addition, the start-up circuit can be adaptive, such as by avoiding current leaking when the supply voltage rail VCC is less than 0.7V, such as when the AC line voltage is not high enough.

The line sensing techniques of this disclosure are accurate and can be controlled to reduce power consumption.

Finally, various techniques of this disclosure can control a terminal voltage of the transistor 202 of FIG. 2, such as controlling a source voltage of a depletion-mode FET. For example, at start-up and during capacitor discharge, the source voltage can be limited below 15V. During line sensing, the source voltage can be regulated at 2V. In addition, the bulk or substrate terminal of the depletion-mode FET can be connected to a reference voltage, such as ground, and the source voltage can be limited to below 2V.

It should be noted that the specific voltages and currents mentioned in this disclosure are non-limiting examples.

Various Notes

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. An interface circuit to couple an input voltage in a first voltage domain to a controller of a power converter circuit in a second voltage domain, the interface circuit comprising:
a start-up circuit including:
a current limiter circuit having an input coupled to with a terminal of a high-voltage transistor, the current limiter circuit having an output coupled to with and provide an input voltage to an input of the controller of the power converter circuit; and
a first shunt regulator circuit having an input coupled to with the terminal of the high-voltage transistor, the first shunt regulator circuit to maintain a first voltage at the terminal of the high-voltage transistor.

2. The interface circuit of claim 1, wherein the current limiter circuit includes a current mirror circuit.

3. The interface circuit of claim 1, wherein the current limiter circuit is coupled in parallel with the first shunt regulator circuit.

4. The interface circuit of claim 1, comprising:
a line voltage detection circuit to sense a current proportional to a line voltage, the line voltage detection circuit including:
a second shunt regulator circuit having an input coupled to with the terminal of the high-voltage transistor, the second shunt regulator circuit to maintain a second voltage at the terminal of the high-voltage transistor, the second voltage lower than the first voltage.

5. The interface circuit of claim 4, comprising:
a capacitor discharging circuit including a low-voltage transistor, the capacitor discharging circuit coupled with the input of the controller of the power converter circuit, wherein an output of the second shunt regulator circuit is coupled with a control node of the low-voltage transistor, the capacitor discharging circuit to operate in response to removal of the line voltage.

6. The interface circuit of claim 5, wherein the capacitor discharging circuit includes the current limiter circuit of the start-up circuit.

7. The interface circuit of claim 4, the second shunt regulator circuit to:
generate a line removal signal to a control node of a low-voltage transistor of a capacitor discharging circuit and to the controller of the power converter circuit; and
generate a low voltage detection signal to the controller of the power converter circuit.

8. The interface circuit of claim 1, comprising the high-voltage transistor, wherein the high-voltage transistor is a depletion-mode transistor having a gate terminal, a source terminal, a drain terminal, and a substrate terminal, wherein the substrate terminal is connected to a ground potential.

9. The interface circuit of claim 1, comprising the high-voltage transistor, wherein the high-voltage transistor is a depletion-mode transistor and wherein the terminal of the high-voltage transistor is a source terminal.

10. An interface circuit to couple an input voltage in a first voltage domain to a controller of a power converter circuit in a second voltage domain, the interface circuit comprising:
a depletion-mode transistor having a gate terminal, a source terminal, a drain terminal, and a substrate terminal, wherein the substrate terminal is connected to a ground potential;
a start-up circuit including:
a current limiter circuit having an input coupled to with a terminal of a high-voltage transistor, the current limiter circuit having an output coupled to with and provide an input voltage to an input of the controller of the power converter circuit; and a first shunt regulator circuit having an input coupled to with the terminal of the high-voltage transistor, the first shunt regulator circuit to maintain a first voltage at the terminal of the high-voltage transistor; and
a line voltage detection circuit to sense a current proportional to a line voltage, the line voltage detection circuit including:
a second shunt regulator circuit having an input coupled to with the terminal of the high-voltage transistor, the second shunt regulator circuit to maintain a second voltage at the terminal of the high-voltage transistor, the second voltage lower than the first voltage.

11. The interface circuit of claim 10, wherein the current limiter circuit includes a current mirror circuit.

12. The interface circuit of claim 10, wherein the current limiter circuit is coupled in parallel with the first shunt regulator circuit.

13. The interface circuit of claim 10, comprising:
a capacitor discharging circuit including a low-voltage transistor, the capacitor discharging circuit coupled with the input of the controller of the power converter circuit, wherein an output of the second shunt regulator circuit is coupled with a control node of the low-voltage transistor, the capacitor discharging circuit to operate in response to removal of the line voltage.

14. The interface circuit of claim 13, wherein the capacitor discharging circuit includes the current limiter circuit of the start-up circuit.

15. The interface circuit of claim 10, the second shunt regulator circuit to:
generate a line removal signal to a control node of a low-voltage transistor of a capacitor discharging circuit and to the controller of the power converter circuit; and
generate a low voltage detection signal to the controller of the power converter circuit.

\* \* \* \* \*